US012613827B2

(12) United States Patent
Shazzad et al.

(10) Patent No.: US 12,613,827 B2
(45) Date of Patent: Apr. 28, 2026

(54) SYSTEM WIDE IDENTIFICATION OF 10Base-T1S NODES

(71) Applicant: GM Global Technology Operations LLC, Detroit, MI (US)

(72) Inventors: Khaja Shazzad, Windsor (CA); Markus Jochim, Troy, MI (US); Sudhakaran Maydiga, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 41 days.

(21) Appl. No.: 18/912,811

(22) Filed: Oct. 11, 2024

(65) Prior Publication Data

US 2026/0105019 A1    Apr. 16, 2026

(51) Int. Cl.
*G06F 13/42*          (2006.01)

(52) U.S. Cl.
CPC ...... *G06F 13/4265* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 2023/0396417 A1* | 12/2023 | Junk | H04L 9/3247 |
| 2024/0244674 A1 | 7/2024 | Huang | |
| 2025/0007748 A1 | 1/2025 | Potts et al. | |

OTHER PUBLICATIONS

German Office Action for German Application No. 102024135749. 5; dated Aug. 28, 2025; 4 pages.

* cited by examiner

*Primary Examiner* — Scott C Sun
(74) *Attorney, Agent, or Firm* — CANTOR COLBURN LLP

(57) ABSTRACT

A system and a method of operating a vehicle. A device node is added to a bus of a communication network of the vehicle. The communication network includes a plurality of device nodes. A selected device node is associated with the device of the vehicle. A plurality of global identification numbers (global IDs) is transmitted onto the bus, in which a selected global ID corresponds to the selected device. A sorting node receives the global IDs, sorts the global IDs into an ascending sequence and assigns a local identification number (local ID) to the selected global ID based on its order in the ascending sequence. The local ID is transmitted from the sorting node to the selected device node. The selected device node is operated based on a signal transmitted over the bus using the local ID of the selected device node.

20 Claims, 6 Drawing Sheets

SYSTEM WIDE IDENTIFICATION OF 10Base-T1S NODES

The subject disclosure relates to single-vehicle networks, and in particular, to a system and method for operating a single-vehicle network using 10Base-T1S ethernet technology.

Next-generation electrical architectures in vehicles include smart electrical (SE) devices connected by a shared-medium-based (bus-based) ethernet technology, such as 10Base-T1S. 10Base-T1S supports low bandwidth communication between a limited number of nodes (i.e., SE devices) in a single bus. A signal is sent to a device by tracking a node identification number (node ID) of its associated node. A single-vehicle network can include many buses, each with a limited number of nodes. This results in the node IDs being sparsely distributed, which introduces various communication issues, such as increased latency and a loss of available bandwidth. Accordingly, it is desirable to provide a single-vehicle network which resolves these issues.

SUMMARY

In one exemplary embodiment, a method of operating a vehicle. A device node is added to a bus of a communication network of the vehicle. The communication network includes a plurality of device nodes, wherein a selected device node is associated with a selected device of the vehicle. A plurality of global identification numbers (global IDs) is transmitted onto the bus. A selected global ID from the plurality of global IDs corresponds to the selected device. The plurality of global IDs is received at a sorting node of the bus. The sorting node sorts the plurality of global IDs into an ascending sequence. A local identification number (local ID) is assigned to the selected global ID based on its order in the ascending sequence at the sorting node. The local ID is transmitted from the sorting node to the selected device node. The selected device node is operated based on a signal transmitted over the bus using the local ID of the selected device node.

In addition to one or more of the features described herein, the communication network includes a coordinator node and the coordinator node is the sorting node.

In addition to one or more of the features described herein, the communication network includes a coordinator node and each of the plurality of device nodes is the sorting node, further comprising receiving the plurality of global IDs at each sorting node, sorting the plurality of global IDs at each sorting node, and assigning the local ID to the selected global ID at each sorting node.

In addition to one or more of the features described herein, the method further includes one of transmitting the local ID from each sorting node to the coordinator node and wherein the device node having a lowest local ID assumes a role of coordinator node.

In addition to one or more of the features described herein, the communication network employs a 10Base-T1S communication protocol.

In addition to one or more of the features described herein, operating the selected device node further comprises transmitting the plurality of global IDs onto the bus using CSMA/CD (carrier sense multiple access with collision detection) technology and transmitting the signal once the local IDs have been assigned using the local IDs and PLCA (Physical Layer Collision Avoidance) technology.

In addition to one or more of the features described herein, the method further includes at least one of transmitting the signal from a coordinator node to the selected device node and operating the device associated with the selected device node based on the signal and operating a device associated with the selected device node to generate the signal and transmitting the signal from the selected device node to the coordinator node.

In another exemplary embodiment, a communication network of a vehicle. The communication network includes a bus, a plurality of device nodes and a sorting node. The plurality of device nodes is connected to the bus. The plurality of device nodes includes a selected device node associated with a device of the vehicle. The plurality of device nodes is configured to transmit a plurality of global identification numbers (global IDs) onto the bus, wherein a selected global ID from the plurality of global IDs corresponds to the selected device node. The sorting node is connected to the bus and is configured to receive the plurality of global IDs from the bus, sort the plurality of global IDs into an ascending sequence, assign a local identification number (local ID) to the selected global ID based on its order in the ascending sequence, and transmit the local ID to the selected device node. The device is operated using a signal transmitted over the bus using the local ID of the selected device node.

In addition to one or more of the features described herein, the communication network includes a coordinator node and the coordinator node is the sorting node.

In addition to one or more of the features described herein, the communication network includes a coordinator node and each of the plurality of device nodes is the sorting node, wherein each sorting node receives the plurality of global IDs, sorts the plurality of global IDs, and assigns the local ID to the selected global ID.

In addition to one or more of the features described herein, wherein one of each sorting node transmits its local ID to the coordinator node and the sorting node having a lowest local ID assumes a role of coordinator node.

In addition to one or more of the features described herein, the communication network employs a 10Base-T1S communication protocol.

In addition to one or more of the features described herein, the plurality of global IDs is transmitted onto the bus using CSMA/CD (carrier sense multiple access with collision detection) technology and the signal is transmitted once the local IDs have been assigned using the local IDs and PLCA (Physical Layer Collision Avoidance) technology.

In addition to one or more of the features described herein, at least one of a coordinator node transmits the signal to the selected device node and the device associated with the selected device node is operated based on the signal and the device associated with the selected device node is operated to generate the signal and the selected device node transmits the signal to the coordinator node.

In yet another exemplary embodiment, a vehicle is disclosed. The vehicle includes a device and a communication network for operating the device. The communication network includes a bus, a plurality of device nodes, and a sorting node. The plurality of device nodes is connected to the bus. The plurality of device nodes includes a selected device node associated with the device. The plurality of device nodes is configured to transmit a plurality of global identification numbers (global IDs) onto the bus, wherein a selected global ID from the plurality of global IDs corresponds to a selected device node. The sorting node is connected to the bus and is configured to receive the plurality of global IDs from the bus, sort the plurality of global IDs into an ascending sequence, assign a local identification number (local ID) to the selected global ID based on its order in the ascending sequence, and transmit the local ID to the selected device node. The device is operated using a signal transmitted over the bus using the local ID of the selected device node.

In addition to one or more of the features described herein, the communication network includes a coordinator node and the coordinator node is the sorting node.

In addition to one or more of the features described herein, the communication network includes a coordinator node and each of the plurality of device nodes is the sorting node, wherein each sorting node receives the plurality of global IDs, sorts the plurality of global IDs, and assigns the local ID to the selected global ID.

In addition to one or more of the features described herein, wherein one of each sorting node transmits its local ID to the coordinator node and the sorting node having a lowest local ID assumes a role of coordinator node.

In addition to one or more of the features described herein, the communication network employs a 10Base-T1S communication protocol.

In addition to one or more of the features described herein, wherein the plurality of global IDs is transmitted onto the bus using CSMA/CD (carrier sense multiple access with collision detection) technology and the signal is transmitted once the local IDs have been assigned using the local IDs and PLCA (Physical Layer Collision Avoidance) technology.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
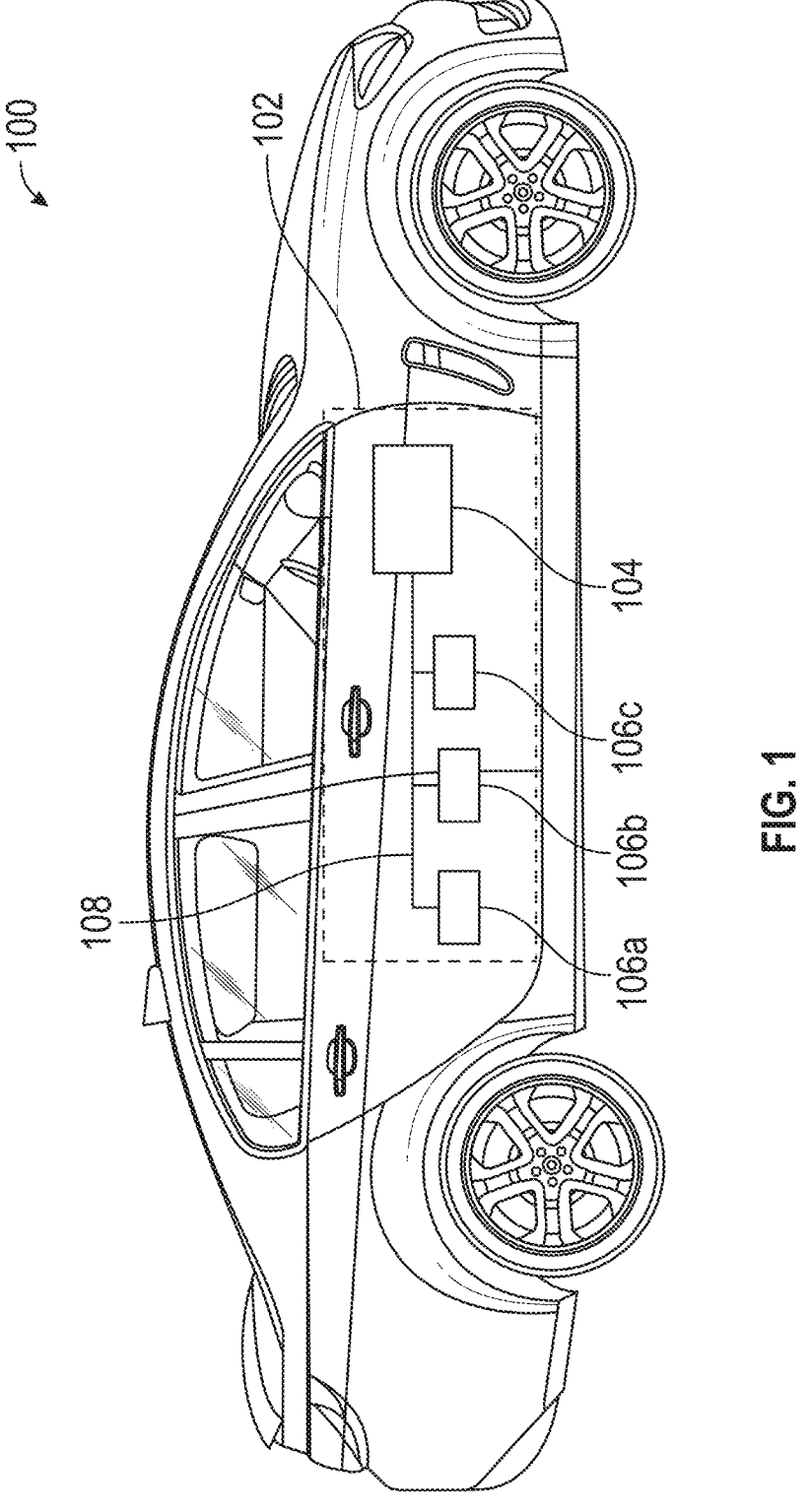
FIG. 1 shows a vehicle including a single-vehicle communication network.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100 including a single-vehicle communication network 102. The single-vehicle communication network 102 includes a controller 104, one or more electronic control units (ECUs 106a-106c) and a control line 108 that provides communication between the controller and the ECUs. Each of the ECUs 106a-106c is dedicated to an electrical device of the vehicle 100, such as a smart electrical (SE) device. Exemplary SE devices include, but are not limited to, an air conditioning unit, a radio, an entertainment system, windshield wipers, etc. Three ECUs 106a-106c are shown for illustrative purposes. However, the single-vehicle communication network 102 can include any number of ECUs, in various embodiments.

The controller 104 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 104 may include a non-transitory computer-readable medium that stores instructions which, when processed by one or more processors of the controller 104, implement a method of preventing package collision in the single-vehicle communication network 102, according to one or more embodiments detailed herein.

Figure 2:
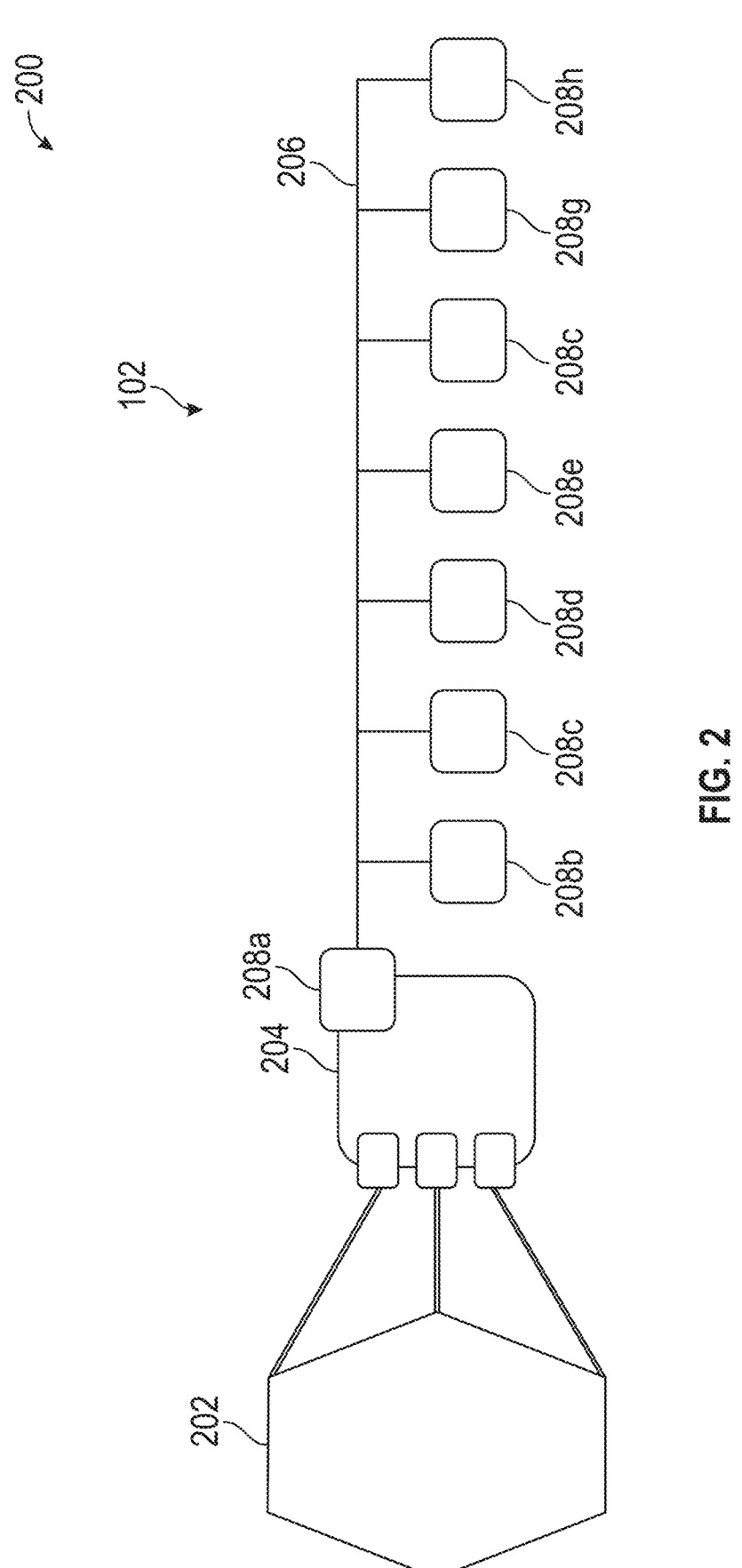
FIG. 2 is a diagram showing details of the single-vehicle communication network of FIG. 1.

FIG. 2 is a diagram 200 showing details of the single-vehicle communication network 102 of FIG. 1. The single-vehicle communication network 102 includes a switch network 202 including a switch 204. The switch 204 is connected to a plurality of nodes via bus or communication line 206. The plurality of nodes includes a coordinator node 208a and a plurality of device nodes 208b-208h. Each of the plurality of device nodes 208b-208h is associated with one of the ECUs of the vehicle. The coordinator node 208a is generally, but not necessarily, located at the switch 204. Which node is the coordinator node is generally software-configurable and can be changed to suit a situation or assignment protocol, as disclosed herein. For example, device node 208e can be the coordinator node, in various embodiments.

The vehicle can be operated by transmitting a signal from the coordinator node to a selected device node and operating a device associated with the selected device node based on the signal. Alternatively, or in addition, the vehicle can be operated by operating a device associated with the selected device node to generate a signal and transmitting the signal from the selected device node to the coordinator node.

Each node (i.e., the coordinator node 208a and the device nodes 208b-208h) can have an associated global identification number ("global ID"). Also, a local identification number ("local ID") can be assigned to a node using the methods disclosed herein.

In various embodiments, the coordinator node 208a and the plurality of device nodes 208b-208h are compliant with 10Base-T1S communication protocol. In 10-Base-T1S, a transmit opportunity for a node in a bus is granted in a sequence based on its local ID which is unique for the bus. Signals can be transmitted using the global ID of a node with CSMA/CD (carrier sense multiple access with collision detection) technology or using the local ID with Physical Layer Collision Avoidance (PLCA) technology (once local IDs have been assigned). Without the coordinator node, the network operates using the CSMA/CD technology. By default, the coordinator node assumes the value of local ID=0. Using PLCA technology minimizes dead time and avoids signal collisions on the bus.

Figure 3:
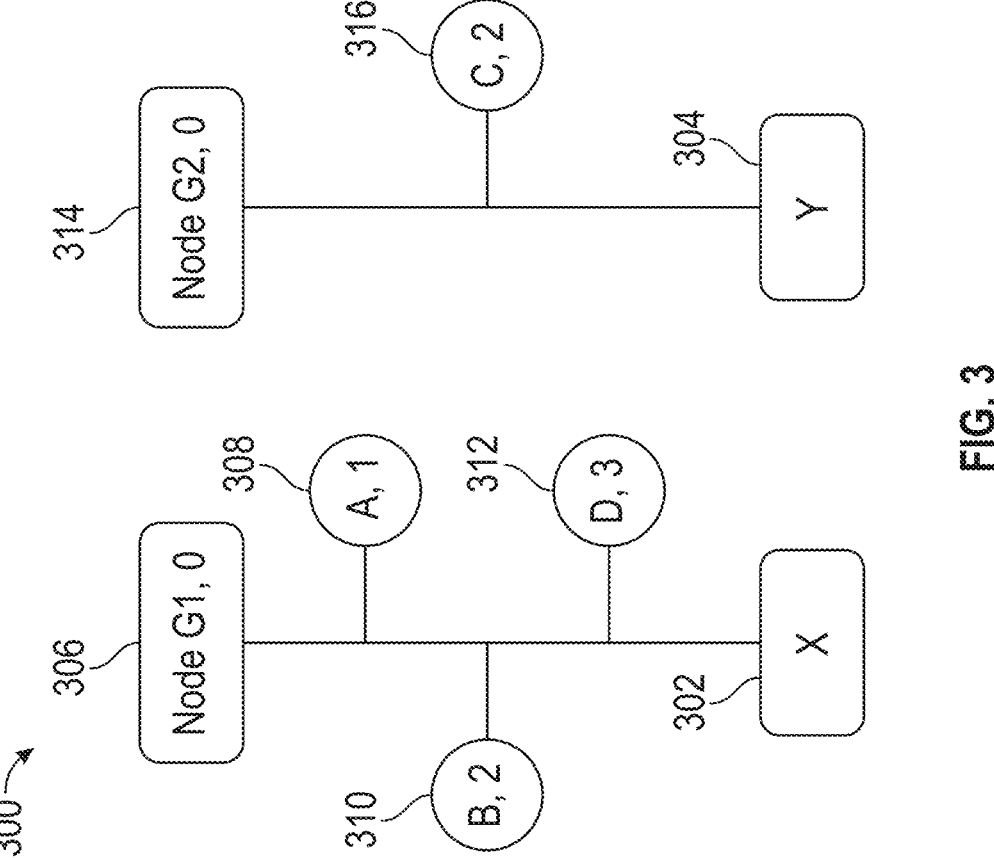
FIG. 3 is a diagram showing the single-vehicle communication network, in an illustrative embodiment.

FIG. 3 is a diagram 300 showing the single-vehicle communication network 102, in an illustrative embodiment. Two buses are shown for illustrative purposes. A first bus 302 includes a first coordinator node 306 and three device nodes (i.e., first device node 308, second device node 310, and third device node 312). A second bus 304 includes a second coordinator node 314 and a fourth device node 316.

On the first bus 302, the first coordinator node can be assigned a name for its global ID, such as global ID= "NodeG1" and a local ID=0. The first device node 308 has a global ID= "A" and an assigned local ID=1, the second device node 310 has a global ID= "B" and an assigned local ID=2, and the third device node 312 has a global ID= "D" and an assigned local ID= "3".

On the second bus 304, the second coordinator node 314 can be assigned a name for its global ID, such as global ID ("NodeG2") and a local ID=0. The fourth device node 316 has a global ID= "C" and an assigned local ID=2.

Figure 4:
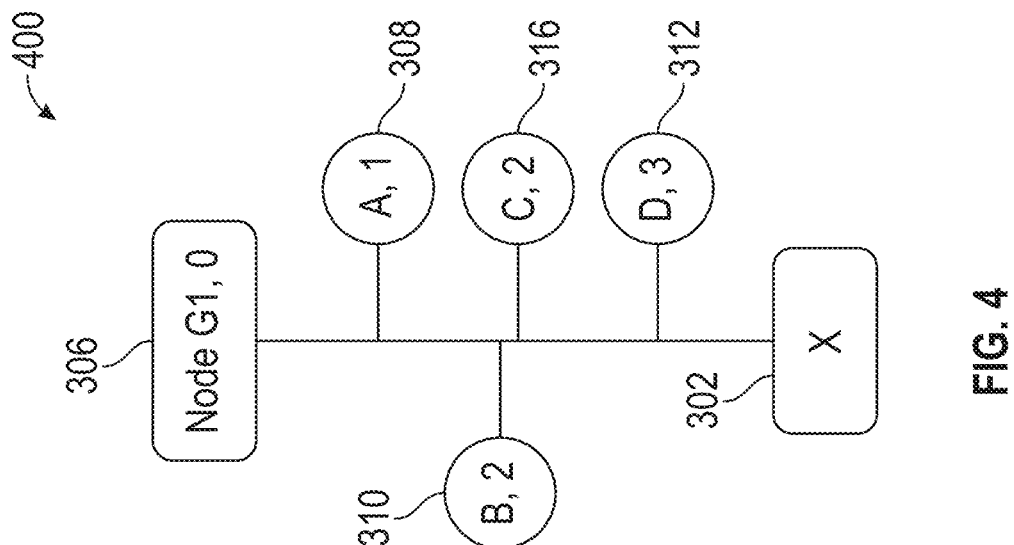
FIG. 4 shows a single-vehicle communication network in which all of the device nodes of FIG. 3 are included on a single bus.

FIG. 4 shows a single-vehicle communication network 102 in which all of the device nodes of FIG. 3 are included on a single bus. The first bus 302 now includes the first coordinator node 306 (global ID= "NodeG1", local ID=0), the first device node 308 (global ID= "A", local ID=1), the second device node 310 (global ID= "B", local ID=2), the third device node 312 (global ID= "D", local ID=3) and the fourth device node 316 (global ID= "C", local ID=2). Due to combining all the device nodes onto the first bus 302, there is a conflict between the local IDs of the second device node 310 and the fourth device node 316, both of which have local ID=2. Similar conflicts can appear when a device node is removed from the bus. The methods disclosed herein describe methods for resolving this conflict.

Figure 5:
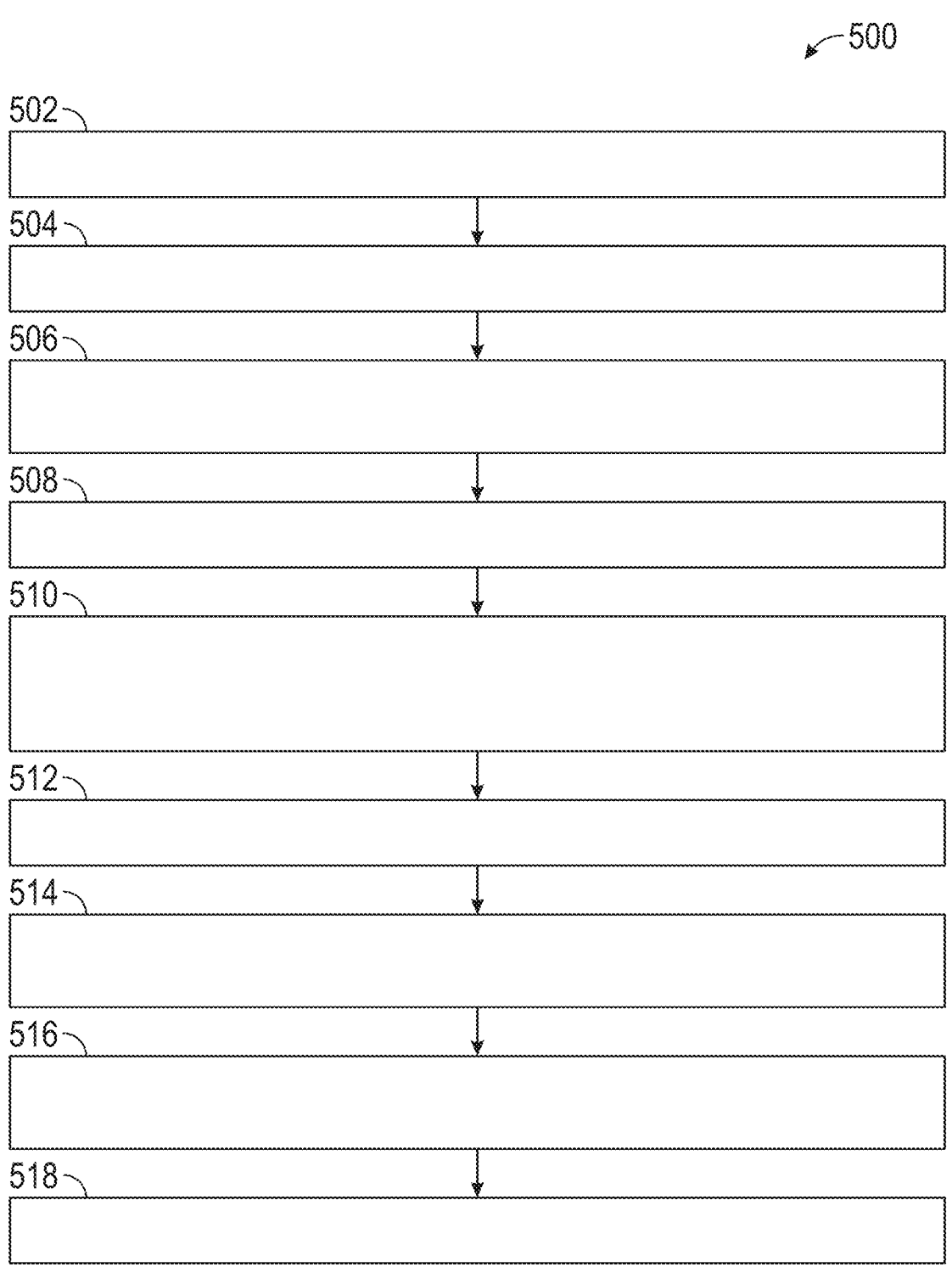
FIG. 5 is a flowchart of a method for resolving assignment problems for local IDs, in a first embodiment.

FIG. 5 is a flowchart 500 of a method for resolving assignment problems for local IDs, in a first embodiment. In box 502, the system is initialized. This can occur when a new node is added or when a node is removed. In box 504, the coordinator node (such as the first coordinator node 306) assigns its local ID to the lowest value (i.e., local ID=0). In box 506, all of the network nodes (i.e., the device nodes) send their global IDs to the coordinator node. The global IDs can be sent using CSMA/CD (carrier sense multiple access with collision detection) technology. The global ID can be a MAC/IP (media access control/internet protocol) address. In box 508, the coordinator node accepts or receives the global IDs. The coordinator node acts as a sorting node for sorting the global IDs in ascending order. In box 510, the coordinator node sorts the global IDs in ascending in an ascending sequence and then assigns the local IDs so that the lowest global ID is assigned to local ID=1, the second lowest global ID is assigned to local ID=2, etc. In other words, the n'h lowest global ID is assigned the local ID=n. In box 512, the coordinator node multicasts the local IDs to all the device nodes on the bus. In box 514, each device node assigns its local ID to itself and unicasts its local ID to the coordinator node to confirm acceptance of the local ID. In box 516, the coordinator node sends a confirmation signal ("ALL_DONE") over the bus to conclude the assignment process. In box 518, all the nodes switch to operating using PCLA technology.

Figure 6:
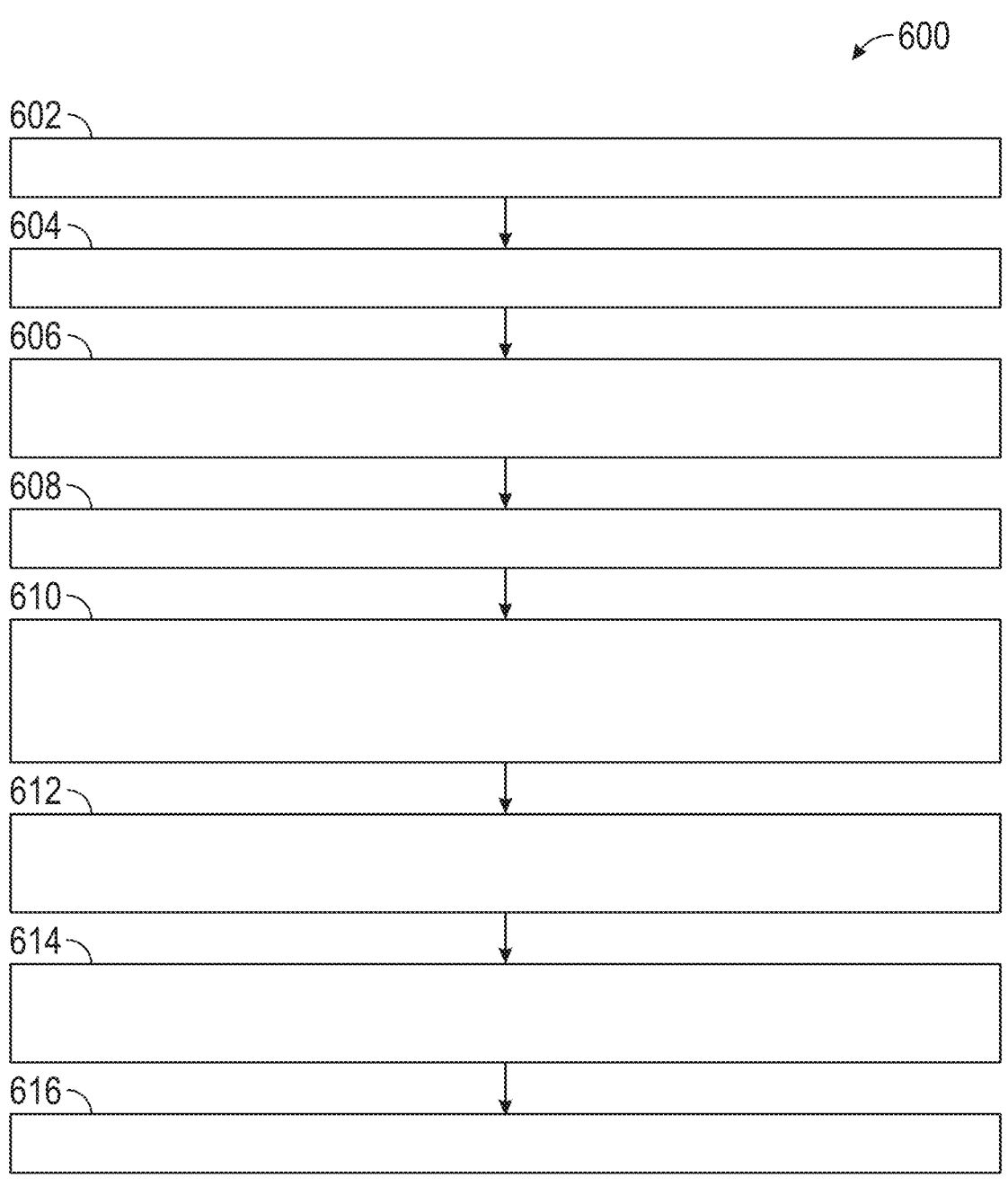
FIG. 6 is a flowchart of a method for resolving assignment problems for local IDs, in a second embodiment.

FIG. 6 is a flowchart 600 of a method for resolving assignment problems for local IDs, in a second embodiment. In box 602, the system is initialized. In box 604, the coordinator node assigns its local ID to the lowest value (i.e., local ID=0). In box 606, all the network nodes other than the coordinator node (i.e., the device nodes) send their global IDs onto the bus using, for example, CSMA/CD technology. In box 608, each node receives the global ID of all of the other nodes of the bus. Each node acts as a sorting node for sorting the global IDs in ascending order. In box 610, each node sorts the global IDs in an ascending sequence and then assigns the local IDs with the lowest global ID having local ID=1, the second lowest global ID having local ID=2, etc. In other words, the n'h lowest global ID is assigned the local ID=n. In box 612, each node assigns its local ID to itself and unicasts its local IDs to the coordinator node. In box 614, the coordinator node sends a confirmation signal ("ALL_DONE") over the bus to conclude the assignment process. In box 616, all the nodes switch to operating using PCLA technology.

Figure 7:
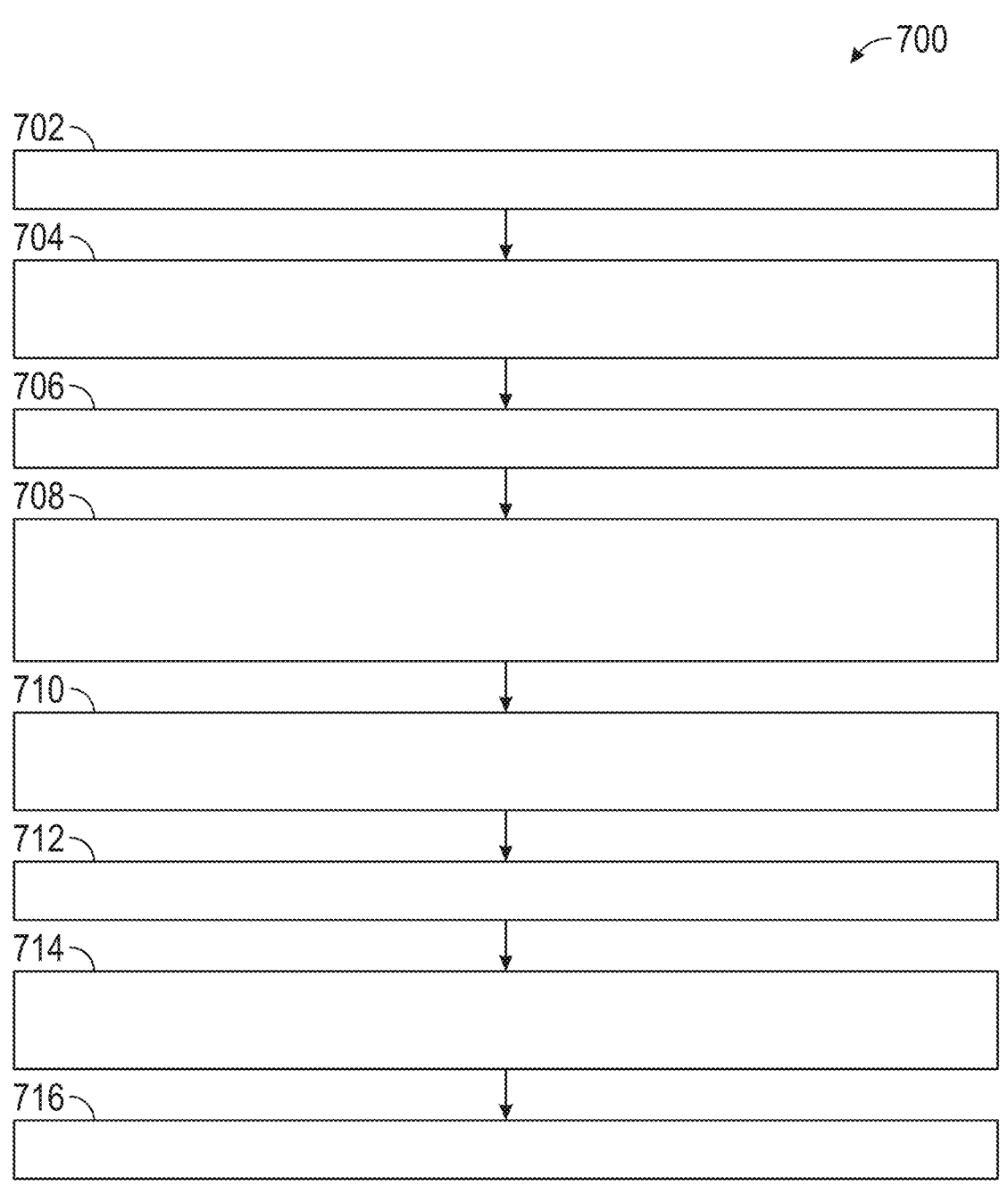
FIG. 7 is a flowchart of a method for resolving assignment problems for local IDs, in a third embodiment.

FIG. 7 is a flowchart 700 of a method for resolving assignment problems for local IDs, in a third embodiment. In box 702, the system is initialized. In box 704, all the network nodes send their global IDs to all other nodes of the network (including the coordinator node) using, for example, CSMA/CD technology. In box 706, all the network nodes receive all the other global IDs from each other. Each node therefore acts as a sorting node for sorting the global IDs in ascending order. In box 708, each node sorts the global IDs in an ascending sequence and then assigns the local IDs with the lowest global ID having local ID=0, the second lowest global ID having local ID=1, etc. In other words, the n$^{th}$ lowest global ID is assigned the local ID=n−1. In box 710, each node assigns its local ID to itself. The node which has local ID=0 assumes the role of the coordinator node. In box 712, each node unicasts its local ID onto the bus (and thus to the coordinator node). In box 714, the coordinator node sends a confirmation signal ("ALL_DONE") over the bus to conclude the assignment process. In box 716, all the nodes switch to operating using PCLA technology.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
adding a device node to a bus of a communication
network of the vehicle, the communication network
including a plurality of device nodes, wherein a
selected device node is associated with a selected
device of the vehicle;
transmitting a plurality of global identification numbers
(global IDs) onto the bus, wherein a selected global ID
from the plurality of global IDs corresponds to the
selected device;
receiving the plurality of global IDs at a sorting node of
the bus;
sorting the plurality of global IDs into an ascending
sequence at the sorting node;
assigning a local identification number (local ID) to the
selected global ID based on its order in the ascending
sequence at the sorting node;
transmitting the local ID from the sorting node to the
selected device node; and
operating the selected device node based on a signal
transmitted over the bus using the local ID of the
selected device node.

2. The method of claim 1, wherein the communication
network includes a coordinator node and the coordinator
node is the sorting node.

3. The method of claim 1, wherein the communication
network includes a coordinator node and each of the plu-
rality of device nodes is the sorting node, further comprising
receiving the plurality of global IDs at each sorting node,
sorting the plurality of global IDs at each sorting node, and
assigning the local ID to the selected global ID at each
sorting node.

4. The method of claim 3, further comprising one of: (i)
transmitting the local ID from each sorting node to the
coordinator node; and (ii) wherein the device node having a
lowest local ID assumes a role of the coordinator node.

5. The method of claim 1, wherein the communication
network employs a 10Base-T1S communication protocol.

6. The method of claim 1, wherein operating the selected
device node further comprises transmitting the plurality of
global IDs onto the bus using CSMA/CD (carrier sense
multiple access with collision detection) technology and
transmitting the signal once the local IDs have been assigned
using the local IDs and PLCA (Physical Layer Collision
Avoidance) technology.

7. The method of claim 1, further comprising at least one
of: (i) transmitting the signal from a coordinator node to the
selected device node and operating the device associated
with the selected device node based on the signal; and (ii)
operating the device associated with the selected device
node to generate the signal and transmitting the signal from
the selected device node to the coordinator node.

8. A communication network of a vehicle, comprising:
a bus;
a plurality of device nodes connected to the bus, the
plurality of device nodes including a selected device
node associated with a device of the vehicle, wherein
the plurality of device nodes is configured to transmit
a plurality of global identification numbers (global IDs)
onto the bus, wherein a selected global ID from the
plurality of global IDs corresponds to the selected
device node; and
a sorting node connected to the bus, wherein the sorting
node is configured to receive the plurality of global IDs
from the bus, sorting the plurality of global IDs into an
ascending sequence, assign a local identification number (local ID) to the selected global ID based on its
order in the ascending sequence, and transmit the local
ID to the selected device node,
wherein the device is operated using a signal transmitted
over the bus using the local ID of the selected device
node.

9. The communication network of claim 8, wherein the
communication network includes a coordinator node and the
coordinator node is the sorting node.

10. The communication network of claim 8, wherein the
communication network includes a coordinator node and
each of the plurality of device nodes is the sorting node,
wherein each sorting node receives the plurality of global
IDs, sorts the plurality of global IDs, and assigns the local
ID to the selected global ID.

11. The communication network of claim 10, wherein one
of: (i) each sorting node transmits its local ID to the
coordinator node; and (ii) the sorting node having a lowest
local ID assumes a role of the coordinator node.

12. The communication network of claim 8, wherein the
communication network employs a 10Base-T1S communi-
cation protocol.

13. The communication network of claim 8, wherein the
plurality of global IDs are transmitted onto the bus using
CSMA/CD (carrier sense multiple access with collision
detection) technology and the signal is transmitted once the
local IDs have been assigned using the local IDs and PLCA
(Physical Layer Collision Avoidance) technology.

14. The communication network of claim 8, wherein at
least one of: (i) a coordinator node transmits the signal to the
selected device node and the device associated with the
selected device node is operated based on the signal; and (ii)
the device associated with the selected device node is
operated to generate the signal and the selected device node
transmits the signal to the coordinator node.

15. A vehicle, comprising:
a device;
a communication network for operating the device, the
communication network including:
a bus;
a plurality of device nodes connected to the bus, the
plurality of device nodes including a selected device
node associated with the device, wherein the plural-
ity of device nodes is configured to transmit a
plurality of global identification numbers (global
IDs) onto the bus, wherein a selected global ID from
the plurality of global IDs corresponds to the
selected device node; and
a sorting node connected to the bus, wherein the sorting
node is configured to receive the plurality of global
IDs from the bus, sort the plurality of global IDs into
an ascending sequence, assign a local identification
number (local ID) to the selected global ID based on
its order in the ascending sequence, and transmit the
local ID to the selected device node,
wherein the device is operated using a signal transmit-
ted over the bus using the local ID of the selected
device node.

16. The vehicle of claim 15, wherein the communication
network includes a coordinator node and the coordinator
node is the sorting node.

17. The vehicle of claim 15, wherein the communication
network includes a coordinator node and each of the plu-
rality of device nodes is the sorting node, wherein each
sorting node receives the plurality of global IDs, sorts the
plurality of global IDs, and assigns the local ID to the
selected global ID.

18. The vehicle of claim 17, wherein one of: (i) each sorting node transmits its local ID to the coordinator node; and (ii) the sorting node having a lowest local ID assumes a role of the coordinator node.

19. The vehicle of claim 15, wherein the communication network employs a 10Base-T1S communication protocol.

20. The vehicle of claim 15, wherein the plurality of global IDs is transmitted onto the bus using CSMA/CD (carrier sense multiple access with collision detection) technology and the signal is transmitted once the local IDs have been assigned using the local IDs and PLCA (Physical Layer Collision Avoidance) technology.

\*　　\*　　\*　　\*　　\*